(12) United States Patent
Dimitrov (10) Patent No.: US 8,755,559 B1
(45) Date of Patent: Jun. 17, 2014

(54) DETERMINING GPS COORDINATES FOR IMAGES

(75) Inventor: Gorjan Dimitrov, Dublin (IE)

(73) Assignee: Google Inc., Mountain View, CA (US)

( * ) Notice: Subject to any disclaimer, the term of this patent is extended or adjusted under 35 U.S.C. 154(b) by 203 days.

(21) Appl. No.: 13/206,887

(22) Filed: Aug. 10, 2011

(51) Int. Cl.
 *G06K 9/00* (2006.01)
(52) U.S. Cl.
 USPC .......................................................... 382/100
(58) Field of Classification Search
 USPC ................. 348/43, 144–148, 169, 222.1; 382/100–104, 289, 296
 See application file for complete search history.

(56) References Cited

U.S. PATENT DOCUMENTS

| 2009/0015685 A1* | 1/2009 | Shulman | 348/222.1 |
| 2010/0060739 A1* | 3/2010 | Salazar | 348/148 |

* cited by examiner

*Primary Examiner* — Atiba O Fitzpatrick
(74) *Attorney, Agent, or Firm* — IP Spring (57) ABSTRACT

Systems, methods and articles of manufacture for GPS coordinate determination for images are described herein. Embodiments of the present disclosure relate to equipping an image with GPS coordinates where the image is uploaded onto a mapping site without GPS coordinates. The mapping site is able to equip the image with GPS coordinates by identifying a recognizable structure in the image and then comparing the recognizable structure with stored structures in the mapping site. The stored structures in the mapping site have GPS coordinates for each. The mapping site compares the recognizable structure of the image without GPS coordinates to a structure stored in the mapping site with GPS coordinates. The mapping site then tags the image without GPS coordinates with the GPS coordinates associated with the stored structure that matches the structure of the image.

17 Claims, 5 Drawing Sheets

FIG. 5

DETERMINING GPS COORDINATES FOR IMAGES

BACKGROUND

Mapping sites provide virtual maps of the Earth by the superimposition of images obtained from but not limited to satellite imagery, aerial photography, and geographic information system data. Image sharing sites provide users with the capability to upload images to be viewed by the public on the image sharing sites. Mapping sites may also provide image sharing capabilities to users where users may upload images into the mapping site to be viewed by the public on the mapping site. Mapping sites with image sharing services display the uploaded images in the geographic location of the image on the mapping site.

For example, an uploaded image of the Eiffel Tower located in Paris, France would be displayed on the mapping site in the geographic location of the Eiffel Tower in Paris, France. Mapping sites require that the images uploaded have embedded global positioning system (GPS) coordinates so that the mapping site may display the uploaded image in the proper geographic location of the image on the mapping site.

BRIEF SUMMARY

Embodiments relate to the determining of GPS coordinates for images. In a first embodiment, a computer implemented method includes determining GPS coordinates for images based on recognizable image details of the image. An image can be received when the image includes a recognizable image detail. A geographic location for the image can be identified based on the recognizable image detail. A GPS coordinate of the geographic location can be associated with the image based on the recognizable image detail.

In another embodiment, a system provides GPS coordinates for images based on recognizable image details. A receiver module receives an image including a recognizable image detail. An identifier module identifies a geographic location for the image based on the recognizable detail. A geo-association module associates a GPS coordinate of the geographic location with the image.

In another embodiment, a computer storage medium encoded with a computer program includes instructions that when executed by one or more processors causes the one or more processors to perform operations to provide GPS coordinates for images based on recognizable image details. An image can be received when the image includes a recognizable image detail. A geographic location for the image can be identified based on the recognizable image detail. A GPS coordinate of the geographic location can be associated with the image based on the recognizable image detail.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers can indicate identical or functionally similar elements.

DETAILED DESCRIPTION

A mapping site can provide a capability of associating a GPS coordinate to an uploaded image that may not previously have a GPS coordinate. The mapping site recognizes a recognizable image detail in the image, and uses it to determine the GPS coordinate of the image.

References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic may be described in connection with an embodiment, it may be within the knowledge of one skilled in the art to effect such feature, structure, or characteristic in connection with other embodiments whether or not explicitly described.

Figure 1:
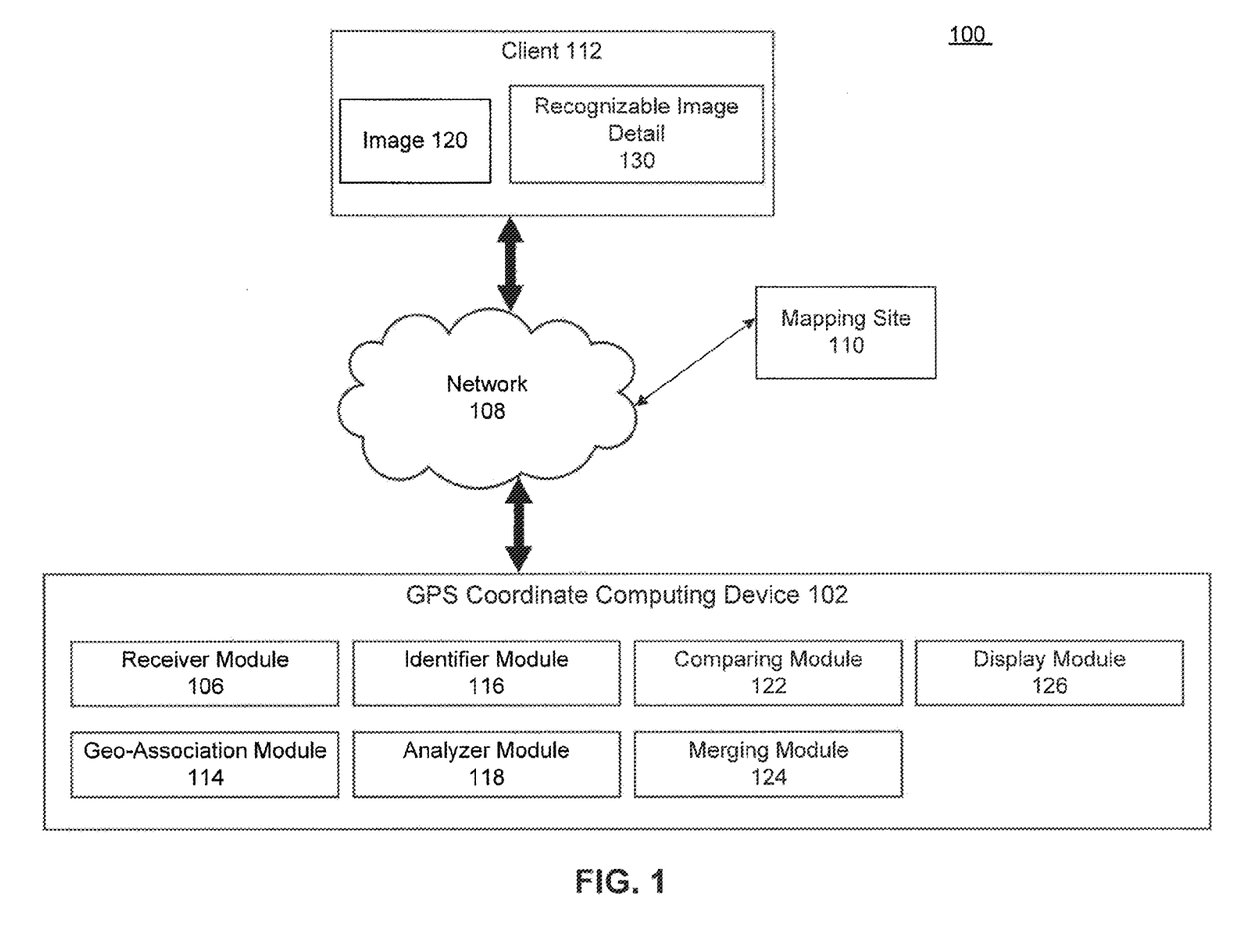
FIG. 1 illustrates a network system with a client and a GPS coordinate computing system architecture, according to an embodiment.

FIG. 1 illustrates a network system 100 in which embodiments of the present invention, or portions thereof, may be implemented. System 100 includes a GPS coordinate computing device 102, a client 112, a network 108, and a mapping site 110. The GPS coordinate computing device 102 includes a receiver module 106, a geo-association module 114, an identifier module 116, an analyzer module 118, a comparing module 122, a merging module 124, and a display module 126. The client 112 includes an image 120 and a recognizable image detail 130.

One or more clients 112 connect to GPS coordinate computing device 102 over a network 108. As referred to herein, GPS coordinate computing device 102 may be any type of processing (or computing) device having one or more processors. For example, GPS coordinate computing device 102 can be a workstation, mobile device, computer, cluster of computers, set-top box, or other device having at least one processor. In an embodiment, multiple modules may be implemented on the same processing device. Such a processing device may include software, firmware, hardware, or a combination thereof. Software may include one or more applications and an operating system. Hardware can include, but may not be limited to, a processor, memory, and/or graphical user interface display.

In embodiments, GPS coordinate computing device 102 may include a conventional web server, email server, or file transfer server modified according to the teachings in this disclosure.

Client 112 may be a device that includes at least one processor, at least one memory, and at least one network interface. For example, client 112 may be implemented on a personal computer, handheld computer, personal digital assistant, smart phone, a mobile telephone, a game console, a set-top box, and the like.

Network 108 may include one or more networks, such as the Internet. In some examples, network 108 may include one or more wide area networks (WAN) or local area networks (LAN). Network 108 may include one or more network technologies such as Ethernet, Fast Ethernet, Gigabit Ethernet, a variant of the IEEE 802.11 standard such as WiFi, and the like. Communication over network 108 takes place using one or more network communication protocols including reliable streaming protocols such as TCP. These examples are illustrative and not intended to limit the present invention.

Mapping site 110 provides a web based service for displaying an interactive map of the world where individuals may zoom from a satellite view all the way to the street level view of a particular street located in a particular city.

GPS coordinate computing device 102 may operate as follows. Client 112 supplies an image 120, where image 120 includes recognizable image detail 130. Receiver module 106 receives image 120 with recognizable image detail 130.

Analyzer module 118 receives image 120 from receiver module 106. In an embodiment, image 120 includes recognizable image detail 130. However, image 120 may not have a GPS coordinate identifying the geographic location of image 120. Recognizable image detail 130 may represent a recognizable structure and/or landmark that identifies the geographic location of image 120. For example, image 120 may include recognizable image detail 130 that represents the Sears Tower. Identifying the Sears Tower as the recognizable image detail 130 would determine the geographic location of image 120 as Chicago, Ill. Analyzer module executes an image detail recognition analysis on image 120 to analyze recognizable image detail 130 to determine the geographic location for image 120. The image detail recognition analysis performed by analyzer module 118 determines the identity of recognizable image detail 130, such as the Sears Tower.

Comparing module 122 compares recognizable image detail 130 to image details stored in GPS coordinate computing device 102. In an embodiment, each stored image detail includes a GPS coordinate identifying the geographic location of the stored image detail. Stored image details may represent recognizable structures and/or landmarks that have GPS coordinates identifying the geographic location of each structure and/or landmark stored in GPS coordinate computing device 102. Comparing module 122 searches the stored image details to find a stored image detail that matches recognizable image detail 130. For example, comparing module searches the stored image details for a stored image detail representing the Sears Tower to match to recognizable image detail 130 representing the Sears Tower.

In an embodiment, identifier module 116 identifies the geographic location for image 120 based on recognizable image detail 130. Based on comparing module 122 comparing recognizable image detail 130 to a stored image detail, identifier module 116 may identify the geographic location for image 120 based on the GPS coordinate associated with the stored image detail. The stored image detail matches recognizable image detail 130 so the GPS coordinate for the stored image detail may also be the GPS coordinate for recognizable image detail 130 identifying the geographic location for image 120.

For example, identifier module 116 identifies the geographic location of image 120 as Chicago, Ill. because recognizable image detail 130 representing the Sears Tower is matched to a stored image detail representing the Sears Tower where the stored image detail includes a GPS coordinate for the Sears Tower. Identification module 130 determines the geographic location of image 120 based on the GPS coordinate of the stored image detail. Geo-association module 114 associates the GPS coordinate of the geographic location with image 120 where the GPS coordinate matches that of the GPS coordinate associated with the stored image detail. In an embodiment, the geo-association module 114 stores the GPS coordinate as metadata, for example metadata in the image file, in a database, or in another application.

In an embodiment, merging module 124 merges image 120 into mapping site 110 so that image 120 may be located in mapping site 110 based on the GPS coordinate associated with image 120 by geo-association module 114. Display module 126 displays image 120 on mapping site 110 in a location in mapping site 110 that matches the GPS coordinate of image 120. Image 120 may be displayed in the location of mapping site 110 so that the location represents the geographic location of image 120. Display module 126 further displays image 120 with other images already displayed in mapping site 110 so that image 120 may be displayed with a geographic accuracy in relation to the other images. For example, image 120 representing the Sears Tower may be displayed with geographic accuracy in relation to an image representing the John Hancock Building in mapping site 110 representing images of Chicago, Ill.

Figure 2:
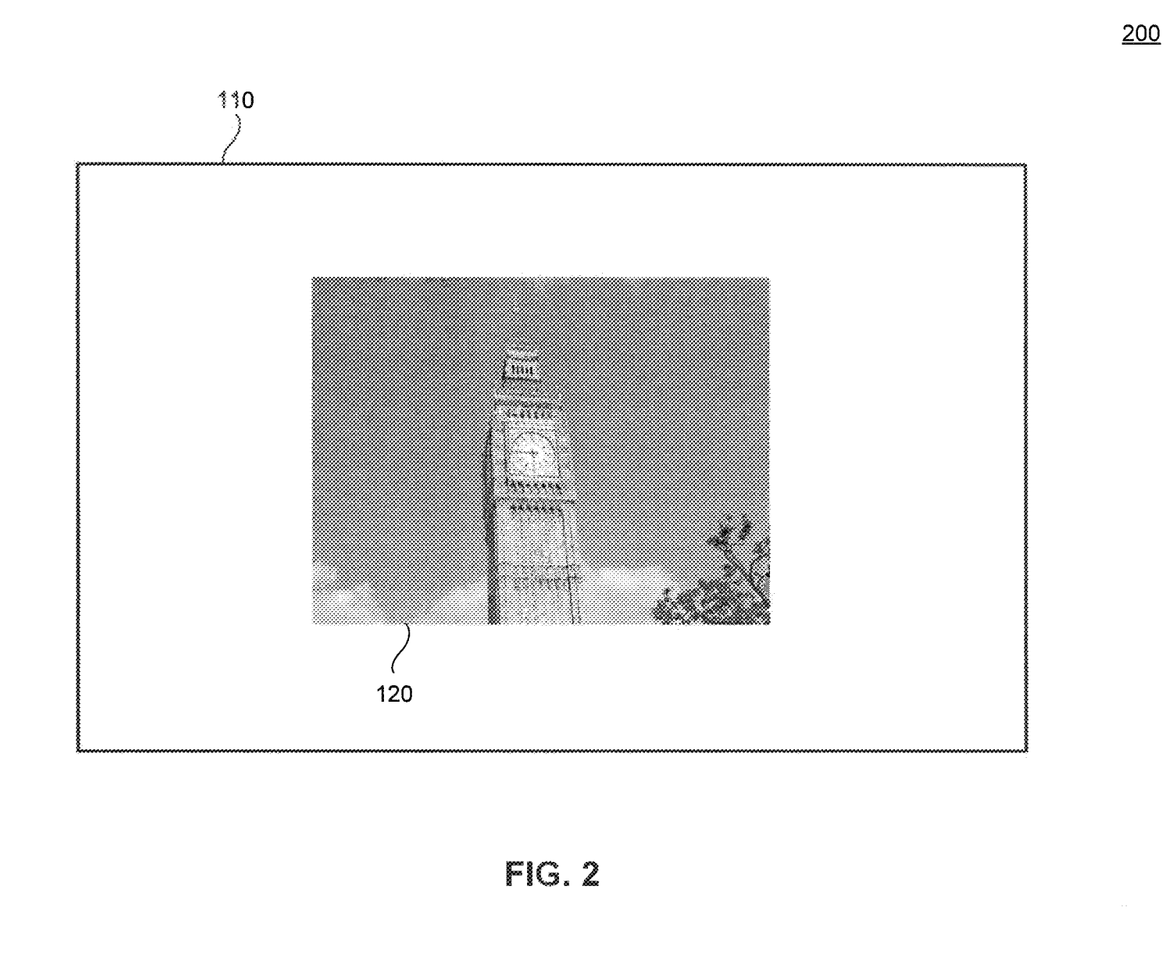
FIG. 2 illustrates an image uploaded onto a mapping site, according to an embodiment.

FIG. 2 depicts an example mapping site system 200 in which embodiments of the present disclosure, or portions thereof, can be implemented. System 200 includes a mapping site 110 and image 120.

Embodiments described herein provide mapping site 110 with a capability to determine the GPS coordinates for image 120. Image 120 represents an actual digital image that an author of image 120 would like to display on mapping site 110. Examples of image 120 include but are not limited to digital representations of a photograph, a drawing, and a painting. Image 120 may be an image that represents an object. The object represented in image 120 may include buildings and/or structures that have recognizable details when viewed in image 120. Recognizable details of the object represented in image 120 may include a recognizable landmark or structural characteristic that may be easily observed by an individual who views image 120.

For example, image 120 may represent an object such as Big Ben located in London, England. Big Ben is a building with recognizable details such as the large clock tower structure of the building that is easily observed by an individual who views image 120 representing Big Ben. An individual could identify the building in image 120 as Big Ben based on the recognizable details of Big Ben.

Mapping site 110 provides a web based service for displaying an interactive map of the world where individuals may zoom from a satellite view all the way to the street level view of a particular street located in a particular city. Mapping site 110 further provides authors of images that represent distinguishable objects, such as image 120, the ability to display those images in the location of the mapping site that represents the geographic location of the actual image. Mapping site 110 displays image 120 in mapping site 110 in a location of mapping site 110 that represents the latitude and longitude coordinates of where image 120 may have been taken.

Mapping site 110 displays image 120 of Big Ben in a location in mapping site 110 that represents the latitude and longitude coordinates of Big Ben on Bridge Street in London England. As an individual navigates through mapping site 110 and zooms into Bridge Street in London, England, the individual may observe image 120 representing Big Ben.

However, images, such as image 120, available for public viewing on mapping site 110 must include GPS coordinates so that mapping site 110 may accurately display the images in the correct location in mapping site 110. For example, if image 120 representing Big Ben were displayed on mapping site 110, the author of image 120 must include the GPS coordinates of Big Ben so that mapping site 110 may accurately display Big Ben on Bridge Street in London, England. If the author of image 120 fails to provide the GPS coordinates of Big Ben when providing image 120 to mapping site 110, then mapping site 110 may fail to recognize where to display image 120. Without the GPS coordinates, mapping site 110 may not recognize that image 120 representing Big Ben should be displayed on Bridge Street in London, England.

In one embodiment, mapping site 110 identifies the geographic location of image 120 by recognizing the recognizable object represented in image 120 which for example may be Big Ben. Mapping site 110 may then search through geographic information stored by mapping site 110 for recognizable objects such as Big Ben. Mapping site 110 may then match the recognizable object in Big Ben of image 120 to the stored geographic information for Big Ben that may include the GPS coordinates for Big Ben. Mapping site 110 may then accurately display image 120 of Big Ben on Bridge Sheet in London, England based on the stored GPS coordinates for Big Ben. If the author of image 120 fails to provide the GPS coordinates of where image 120 may have been taken, mapping site 110 may be able to provide the GPS coordinates from the stored geographic information in mapping site 110.

Figure 3:
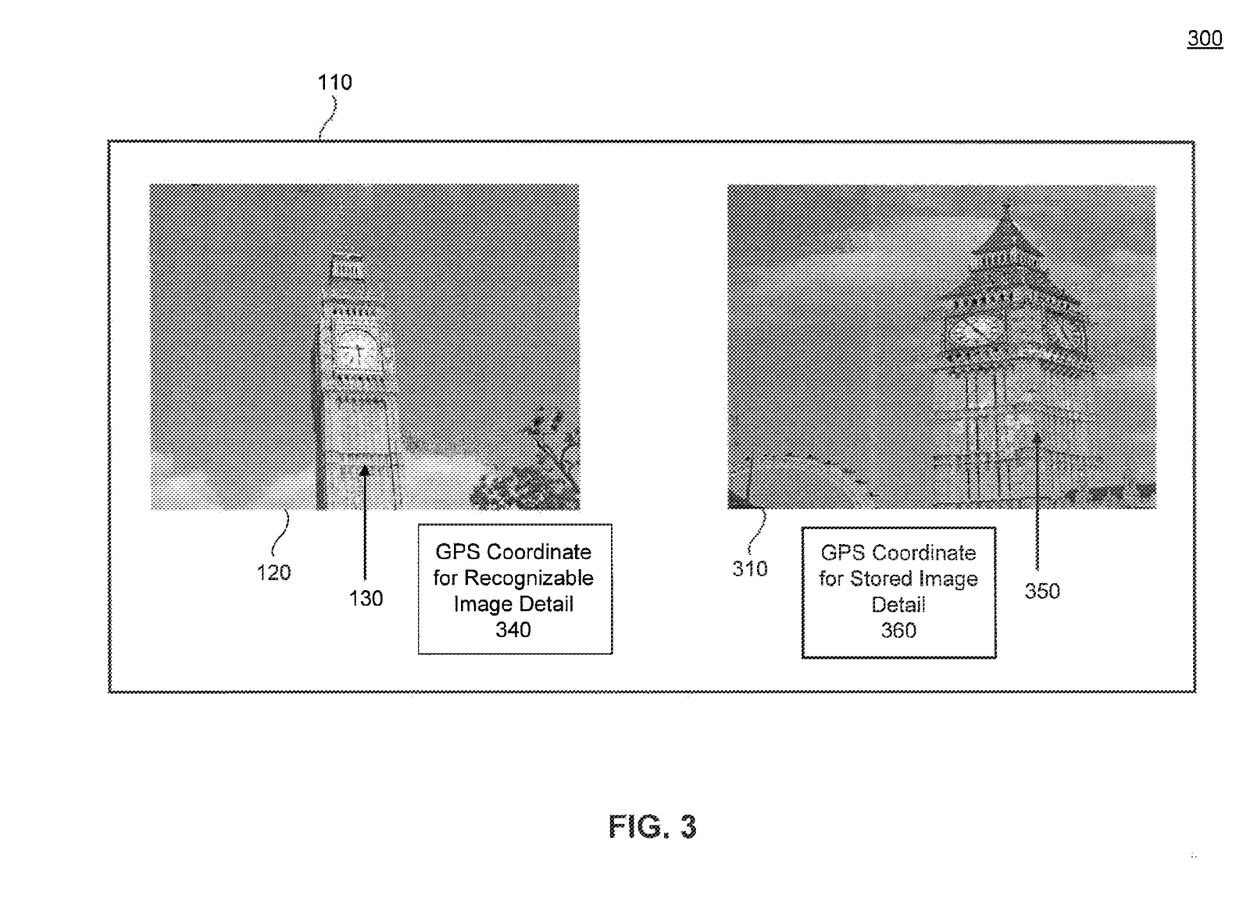
FIG. 3 illustrates an image uploaded onto a mapping site with a recognizable image detail compared to a stored image on the mapping site with a stored image detail, according to an embodiment.

FIG. 3 depicts an example mapping site system 300 in which embodiments of the present disclosure, or portions thereof, can be implemented. Mapping site 110 includes image 120 with recognizable image detail 130 and stored image 310 with stored image detail 350. A GPS coordinate for recognizable image detail 340 can be calculated for image 120 based on a GPS coordinate for stored image detail 360.

In an embodiment, mapping site 110 posts images, such as image 120, for public display. Users of mapping site 110 may search mapping site 110 and examine the images, such as image 120, displayed on mapping site 110. Mapping site 110 may be accessed by web-based search tools used to search for images available for view on the web.

Recognizable image detail 130 includes a distinct visual feature unique to image 120. Recognizable image detail 130 may include a distinct building and/or structure that may be easily identifiable, such as a landmark, to an individual who views image 120. For example, image 120 may represent an object such as Big Ben located in London, England. Big Ben is a building with recognizable details such as the large clock tower structure of the building that is easily observed by an individual who views image 120 representing Big Ben. An individual could identify the building in image 120 as Big Ben based on the recognizable details of Big Ben.

The author of image 120 with recognizable image detail 130 may wish to display image 120 on mapping site 110 so that mapping site 110 may display image 120 in the location of mapping site 110 that represents the accurate geographic location of recognizable image detail 130. For example, the author of image 120 may wish to on the mapping site 110 display image 120 with recognizable image detail 130 of Big Ben on Bridge Street in London, England. However, in an embodiment, the author of image 120 fails to provide the GPS coordinate for image 120 that represents the geographic location of Big Ben.

Stored image 310 may be an image stored by mapping site 110 where stored image 110 is not provided by an author but rather an image stored as a reference for mapping site 110. Unlike image 120 that may be provided by an author to be displayed by mapping site 110, stored image 310 may not be displayed by mapping site 110 but used by mapping site 110 as a reference for geographic location data. Similar to image 120, stored image 310 may include buildings and/or structures that have recognizable details when viewed. Stored image 310 includes stored image detail 350 where stored image detail 350 may include a distinct building and/or structure that may be easily identifiable. For example, stored image 310 may represent an object such as Big Ben located in London, England. Big Ben is a building with recognizable details such as the large clock tower structure of the building that is easily recognizable Unlike image 120 where the author failed to provide GPS coordinates, stored image 310 includes geographic location data for stored image detail 350 that may include the GPS coordinate for stored image detail 350. For example, stored image 310 includes the GPS coordinate for Big Ben. Mapping site 110 may rely on the stored images, such as stored image 310, to obtain GPS coordinates for images, such as image 120, that fail to include GPS coordinates. With the GPS coordinate provided with stored image 310, mapping site 110 may accurately display image 120 in the correct location based on the GPS coordinate of stored image 310.

As will be appreciated by persons skilled in the relevant art, stored image 310 may not be limited to an actual image that includes geographic location data for stored image detail 310. Rather stored image 310 may include any type of data and/or method in which stored image detail 350 may be matched with the GPS coordinates of stored image detail 350. Stored image 310 may include a description and/or the name of stored image detail 350 where the GPS coordinate for stored image detail 350 may be linked with such a description and/or name. Stored image 310 may simply include the GPS coordinates for stored image detail 350 where the GPS coordinates for stored image detail 350 links to a database listing of GPS coordinates. Each GPS coordinate in the database matches stored image detail 350.

In an embodiment, mapping site 110 associates the UPS coordinates with image 120 based on the UPS coordinates for stored image 310 so that image 120 may be accurately displayed by mapping site 110 in the correct location representing the geographic location of image 120. Mapping site 110 receives image 120 with recognizable image detail 130 from the author wishing to display image 120 on mapping site 110. However, as noted above, image 120 does not include UPS coordinates so that mapping site 110 may accurately display image 120.

In an embodiment, mapping site 110 identifies a geographic location for image 120 based on recognizable image detail 130. Mapping site 110 executes an image detail recognition analysis on image 120 to analyze recognizable image detail 130 so that the geographic location for image 120 may be identified. The image detail recognition analysis may entail extracting recognizable image detail 130 from image 120 to identify recognizable image detail 130. For example, the image detail recognition analysis analyzes recognizable image detail 130. Because recognizable image detail 130 includes an easily recognizable image in Big Ben, mapping site 110 may be able to recognize that image 120 represents Big Ben.

In an embodiment, image 120 is represented by a raw image file that contains data from the image sensor of, for example, a digital camera, image scanner, or motion picture film scanner. The raw image file of image 120 contains recognizable image detail 130. The image detail recognition analysis may sample the raw image file of image 120 by, for example, sampling the raw image file to extract data from pixels in the raw image file representing recognizable image detail 130. Sampling the raw image file to extract data from pixels enables mapping site 110 to identify recognizable image detail 130 as for example, Big Ben.

in another example, image 120 is represented by a JPEG representation of the raw image file. As with the raw image file, mapping site 110 may perform the image recognition analysis on the JPEG representation to extract data from pixels in the JPEG representation to identify recognizable image detail 130. In a further example, the image recognition analysis may be performed a browser plug-in or a visual algorithm.

In an embodiment, a comparison of recognizable image detail 130 of image 120 with stored image detail 350 of stored image 310 may be performed to determine the GPS coordinates for image 120. This comparison may entail comparing recognizable image detail 130 of image 120 to stored image detail 350 of stored image 310. If recognizable image detail 130 matches stored image detail 350, then the likelihood that GPS coordinate for stored image detail 360 may also be the correct GPS coordinate for recognizable image detail 340.

For example, once mapping site 110 has identified Big Ben as recognizable image detail 130 for image 120, mapping site 110 searches through the stored image details stored in mapping site 110 to find stored image detail 350 that matches recognizable image detail 130. Stored image detail 350 also represents Big Ben and includes GPS coordinates for stored image detail 360 that identifies the GPS coordinate for Big Ben as being located on Bridge Road in London, England. Because image 120 represents Big Ben and stored image 310 represents Big Ben, it is likely that GPS coordinate for stored image detail 360 matches that of image 120. Mapping site 110 tags image 120 with GPS coordinate for recognizable image detail 340 that includes GPS coordinates identical to GPS coordinate for stored image detail 360.

In an embodiment, image 120 may be merged into mapping site 110. Mapping site 110 determines where to display image 120 based on GPS coordinate for recognizable image detail 340. Mapping site 110 displays image 120 in the location that represents the geographic location of where image 120 was taken because GPS coordinate for recognizable image detail 340 may accurately identify the geographic location of image 120. For example, mapping site 110 displays image 120 that represents Big Ben on Bridge Road in London, England so that individuals that search mapping site 110 may accurately view image 120 on Bridge Road in London, England.

In an embodiment, mapping site 110 displays image 120 with other images displayed on mapping site 110. Once image 120 has been accurately tagged with GPS coordinate for recognizable image detail 340, mapping site 110 displays image 120 contingent to other images with GPS coordinates similar to image 120. For example, image 120 representing Big Ben may be displayed close to an image that represents Westminster Bridge located on Bridge Road in London, England. Based on GPS coordinate for recognizable image detail 340 for image 120 and the GPS coordinates for the Westminster Bride image, mapping site 110 may accurately display image 120 representing Big Ben and the image representing Westminster Bridge contingent to each other on Bridge Road in London, England. An individual who searches mapping site 110 may view image 120 representing Big Ben and the image representing the Westminster Bridge contingent to each other on Bridge Road in London, England.

In an embodiment, mapping site 110 may display advertisements relative to GPS coordinate for recognizable image detail 340. In such an embodiment, mapping site 110 may customize advertisements displayed based on the geographical location of where an individual may be searching mapping site 110. Mapping site 110 determines which advertisements to display based on GPS coordinate for recognizable image detail 340. As the individual views image 120 with GPS coordinate for recognizable image detail 340, mapping site 110 may display the individual advertisements for but not limited to hotels, restaurants, and/or stores that may be located in a similar vicinity as GPS coordinate for recognizable image detail 340. For example, mapping site 110 may display advertisements for hotels that may be in the same neighborhood has Big Ben in London, England.

Figure 4:
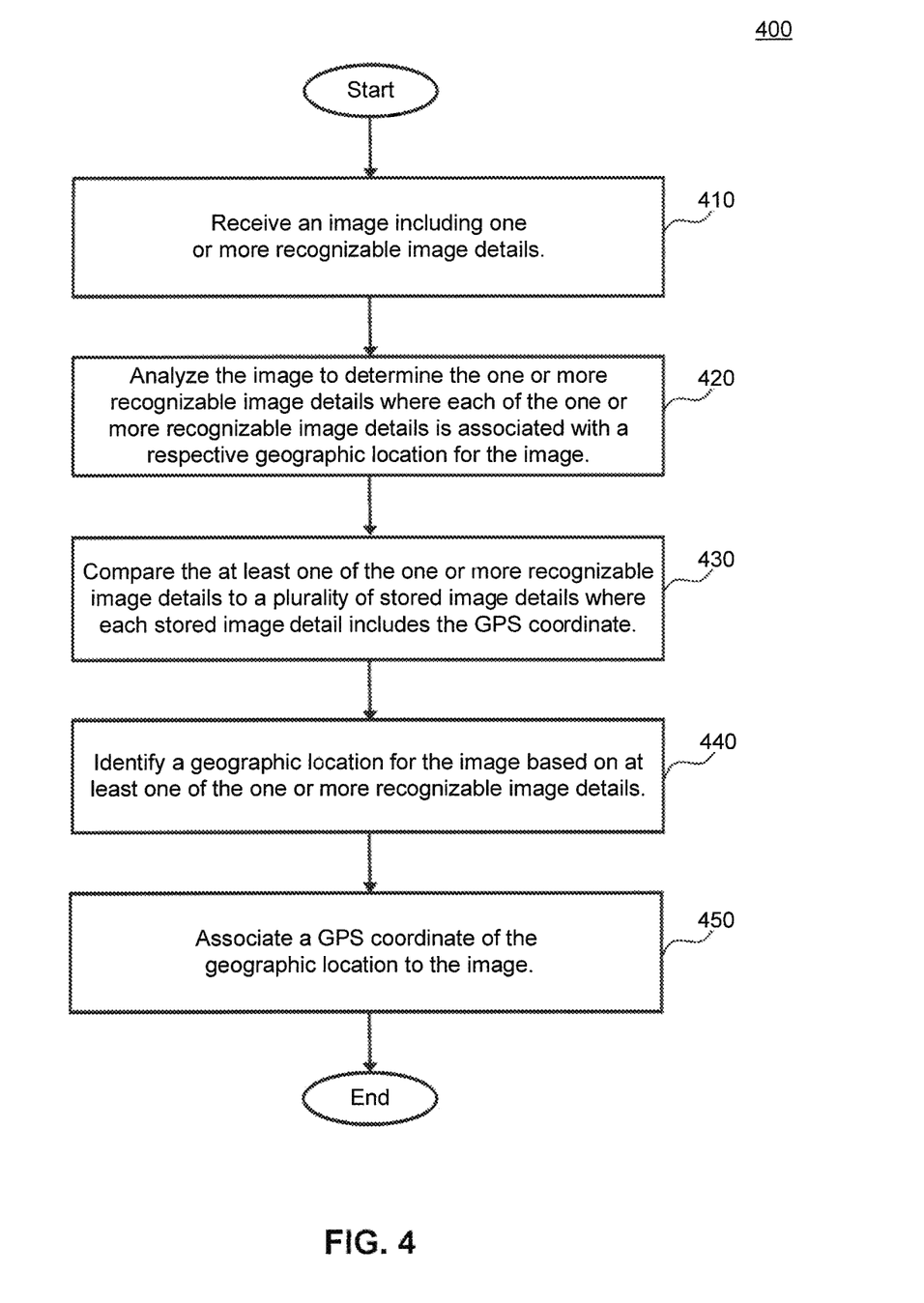
FIG. 4 is a flowchart illustrating an example aspect of operation, according to an embodiment.

FIG. 4 is a flowchart showing an example method 400 of determining GPS coordinates for images based on a recognizable image detail. As shown in FIG. 4, method 400 begins at stage 410, when an image including a recognizable image detail is received. For example, as shown in FIG. 1, receiver module 106 of GPS coordinate computing device 102 receives image 120 with recognizable image detail 130.

At stage 420, an image detail recognition analysis is executed on the image. For example, as shown in FIG. 1, analyzer module 118 of GPS coordinate computing device 102 executes an image detail recognition analysis on image 120 where recognizable image detail 130 is analyzed to identify the geographic location for image 120.

At stage 430, the recognizable image detail is matched to a plurality of stored image details. For example, as shown in FIG. 1 and FIG. 3, comparing module 124 of GPS coordinate computing device 102 compares recognizable image detail 130 to a plurality of stored image details, such as stored image detail 350, where stored image detail 350 includes GPS coordinate for stored image detail 360.

At stage 440, a geographic location for the image based or the recognizable image detail is identified. For example, as shown in FIG. 1, identifier module 116 of GPS coordinate computing device 102 identifies a geographic location for image 120 based on recognizable image detail 130.

At stage 450, a GPS coordinate of the geographic location is associated with the image. For example, as shown in FIG. 1 and FIG. 3, geo-association module 114 of GPS coordinate computing device 102 associates GPS coordinate for recognizable image detail 340 for the geographic location with image 120.

Embodiments can work with software, hardware, and/or operating system implementations other than those described herein. Any software, hardware, and operating system implementations suitable for performing the functions described herein can be used. Embodiments are applicable to both a client and to a server or a combination of both.

Figure 5:
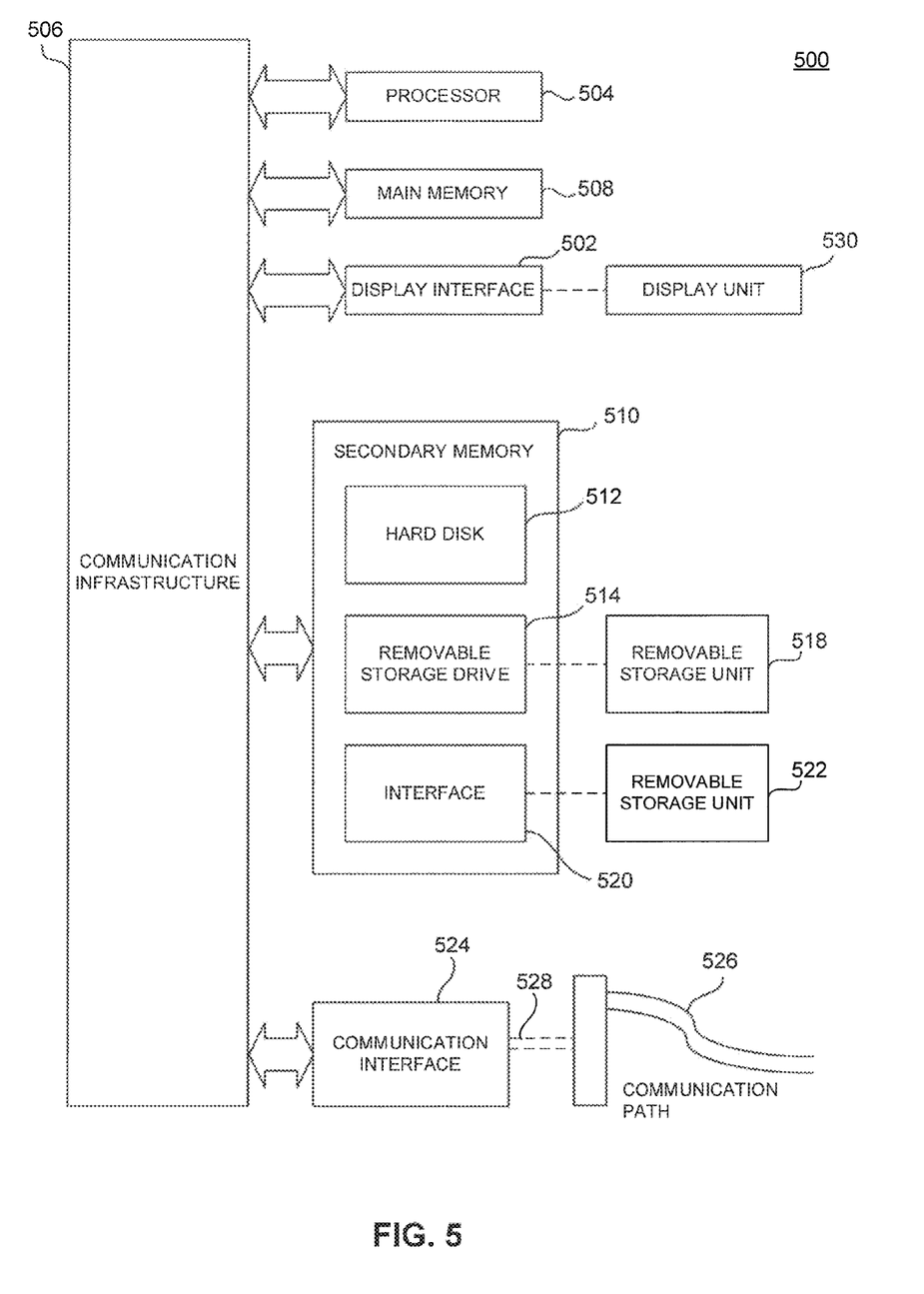
FIG. 5 is a system diagram that can be used to implement embodiments described herein.

FIG. 5 illustrates an example computer system 500 in which embodiments of the present invention, or portions thereof, may be implemented as computer-readable code. For example, mapping site 110 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIG. 1, FIG. 2, and FIG. 3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the stages in the method illustrated by flowchart 500 of FIG. 5 discussed above. Accordingly, such computer programs represent controllers of the computer system 500. Where the invention is implemented using software, the software may be stored in a computer program product and loaded into computer system 500 using removable storage drive 514, interface 520, and hard disk drive 512, or communications interface 524.

The Brief Summary and Abstract sections may set forth one or more but not all example embodiments and thus are not intended to limit the scope of the present disclosure and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computer implemented method, comprising:
    receiving an image including one or more recognizable image details;
    identifying a geographic location for the image based on at least one of the one or more recognizable image details, wherein the recognizable image details include one or more objects represented in the image;
    analyzing the image to determine the one or more recognizable image details in the image, wherein each of the one or more recognizable image details is associated with a respective geographic location for the image;
    comparing the at least one of the one or more recognizable image details to a plurality of stored image details, wherein each stored image detail includes the GPS coordinate; and associating a GPS coordinate of the geographic location with the image, wherein the GPS coordinate includes a GPS coordinate of at least one of the objects represented in the image.

2. The method of claim 1, wherein each existing image of a plurality of existing images located in a mapping site includes the stored image detail with the GPS coordinate.

3. The method of claim 1, further comprising:
merging the image into a mapping site, wherein a location for the Image on the mapping site is determined by the GPS coordinate for the image.

4. The method of claim 1, further comprising:
displaying the image on the mapping site, wherein the geographic location for the image matches a location of the image in the mapping site.

5. The method of claim 1, further comprising:
displaying the image with the plurality of existing images located in a mapping site, wherein the image and the plurality of existing images are displayed with a geographic accuracy on the mapping site based on the GPS coordinates for the image and the plurality of existing images.

6. The method of claim 1, wherein an advertisement is customized based on the GPS coordinate of the image, and wherein the advertisement includes a geographic location based content for the geographic location of the image.

7. The method of claim 1, wherein the one or more recognizable image details comprise a landmark.

8. A system, comprising:
a receiver module that receives an image including one or more a recognizable image details; wherein the recognizable image details include one or more objects represented in the image;
an identifier module that identifies a geographic location for the image based on at least one of the one or more recognizable details;
an analyzer module that analyzes the image to determine the one or more recognizable image details in the image, wherein each of the one or more recognizable image details is associated with a respective geographic location for the image;
a comparing module that compares the at least one of the one or more recognizable image details to a plurality of stored image details, wherein each stored image detail includes the coordinate; and
a geo-association module that associates a GPS coordinate of the geographic location with the image, wherein the GPS coordinate includes a GPS coordinate of at least one of the objects represented in the image.

9. The system of claim 8, wherein each existing image of a plurality of existing images located in a mapping site includes the stored image detail with the GPS coordinate.

10. The system of claim 8, further comprising:
a merging module that merges the image into the mapping site, wherein a location for the image on the mapping site is determined by the GPS coordinate for the image.

11. The system of claim 8, further comprising:
a displaying module that displays the image on a mapping site, wherein the geographic location for the image matches a location of the image in the mapping site.

12. The system of claim 8, further comprising:
the display module that displays the image with the plurality of existing images located in a mapping site, wherein the image and the plurality of existing images are displayed with a geographic accuracy on the mapping site based on the GPS coordinates for the image and the plurality of existing images.

13. The system of claim 8, wherein an advertisement is customized based on the GPS coordinate of the image, and wherein the advertisement includes a geographic location based content for the geographic location of the image.

14. The system of claim 8, wherein the one or more recognizable image details comprise a landmark.

15. A non-transitory computer storage device encoded with a computer program, the program comprising instructions that when executed by one or more processors cause the one or more processors to perform operations comprising:
receiving an image including one or more recognizable image details;
identifying a geographic location for the image based on at least one of the one or more recognizable image details, wherein the recognizable image details include one or more objects represented in the image; and
analyzing the image to determine the one or more recognizable image details in the image, wherein each of the one or more recognizable image details is associated with a respective geographic location for the image;
comparing the at least one of the one or more recognizable image details to a plurality of store image details, wherein each stored image detail includes the GPS coordinate; and
associating a GPS coordinate of the geographic location with the image, wherein the GPS coordinate includes a GPS coordinate of at least one of the objects represented in the image.

16. The computer storage device of claim 15, further comprising:
merging the image into the mapping site, wherein a location for the image on the mapping site is determined by the GPS coordinate for the image.

17. The computer storage device of claim 15, further comprising:
displaying the image on a mapping site, wherein the geographic location for the Image matches a location of the image in the mapping site.

* * * * *